ously patented devices. Applicants have invented such an improved musical instrument teaching aid.

United States Patent [19]
Kavoklis et al.

[11] Patent Number: 4,905,567
[45] Date of Patent: Mar. 6, 1990

[54] MUSICAL INSTRUMENT TEACHING AID

[76] Inventors: Nicholas J. Kavoklis; Mary E. B. Kavoklis, both of 5520 Tracy Dr., Youngstown, Ohio 44512

[21] Appl. No.: 313,910

[22] Filed: Feb. 23, 1989

[51] Int. Cl.⁴ ............................................. G09B 15/02
[52] U.S. Cl. .................................................. 84/479 R
[58] Field of Search ................................... 84/479–481

[56] References Cited

U.S. PATENT DOCUMENTS

| | | | |
|---|---|---|---|
| 777,793 | 12/1904 | Kruschke | 84/481 |
| 1,172,442 | 2/1916 | De Bellis | 84/479 |
| 1,229,735 | 6/1917 | Force | 84/478 |
| 1,293,923 | 2/1919 | Reeve | 84/479 |
| 1,293,997 | 2/1919 | Von Bornstedt et al. | 84/479 |
| 1,567,019 | 12/1925 | Barnes | 84/479 |
| 1,725,844 | 8/1929 | Barnes | 84/479 |
| 2,188,098 | 1/1940 | Bostelmann, Jr. | 84/479 |
| 3,350,973 | 11/1967 | Weis et al. | 84/478 |
| 3,707,897 | 1/1973 | Hertz | 84/479 |
| 4,254,686 | 3/1981 | Leonard | 84/481 |

OTHER PUBLICATIONS

Ex parte Dere, 118 USPQ 541, (POBA 1957).

Primary Examiner—Lawrence R. Franklin
Attorney, Agent, or Firm—Reese Taylor

[57] ABSTRACT

A teaching aid for keyboard instruments including first and second elongate sections configured to be snapped together to form an aid approximating the length of a typical keyboard. Each section has an outboard end notched so as to engage the end pieces of the instrument and front and rear indicia bearing surfaces with the indicia representing musical notes. The note spacing on the front surfaces comprises a first arrangement and the note spacing on the rear surfaces comprise a second, different arrangement.

3 Claims, 3 Drawing Sheets

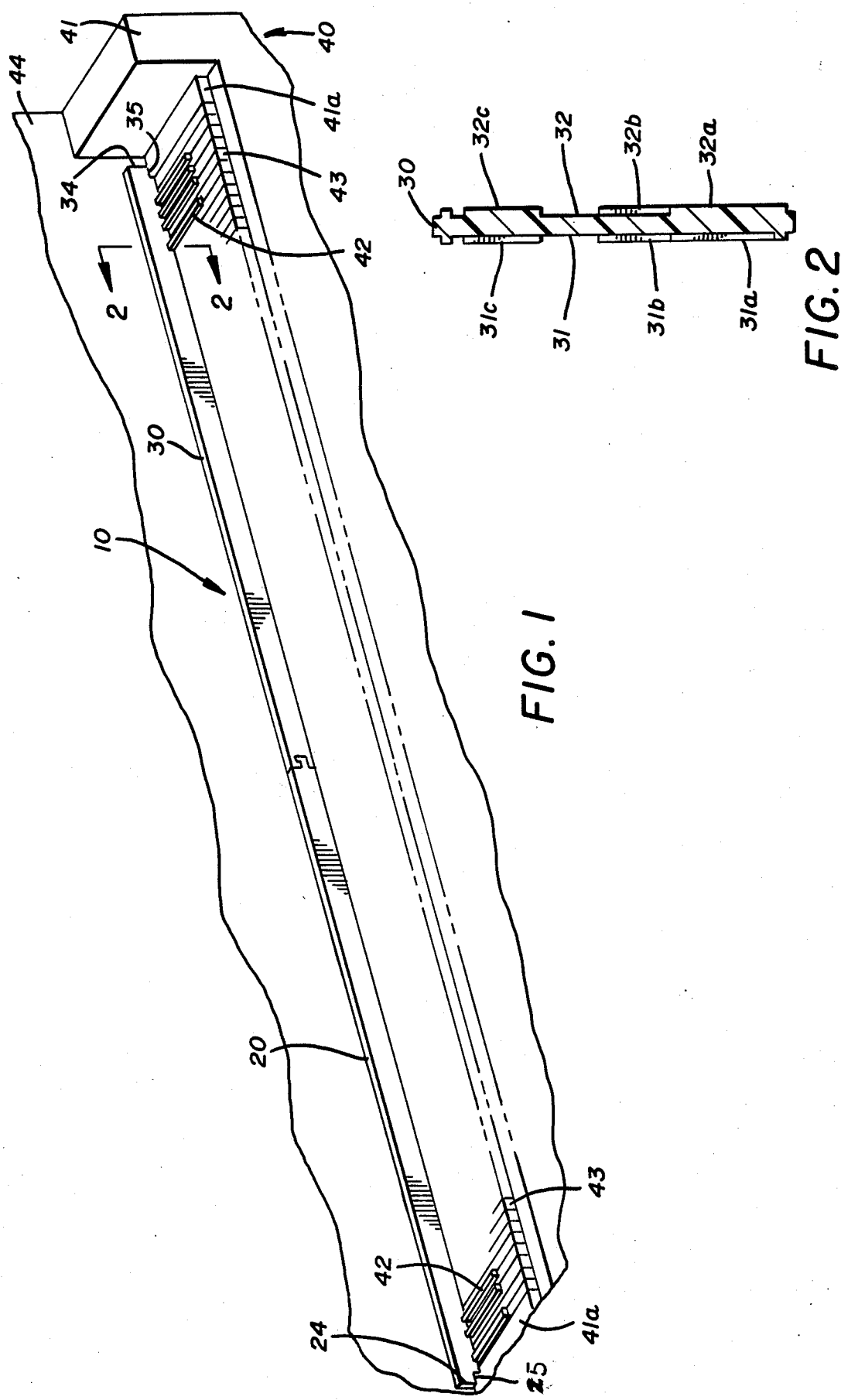

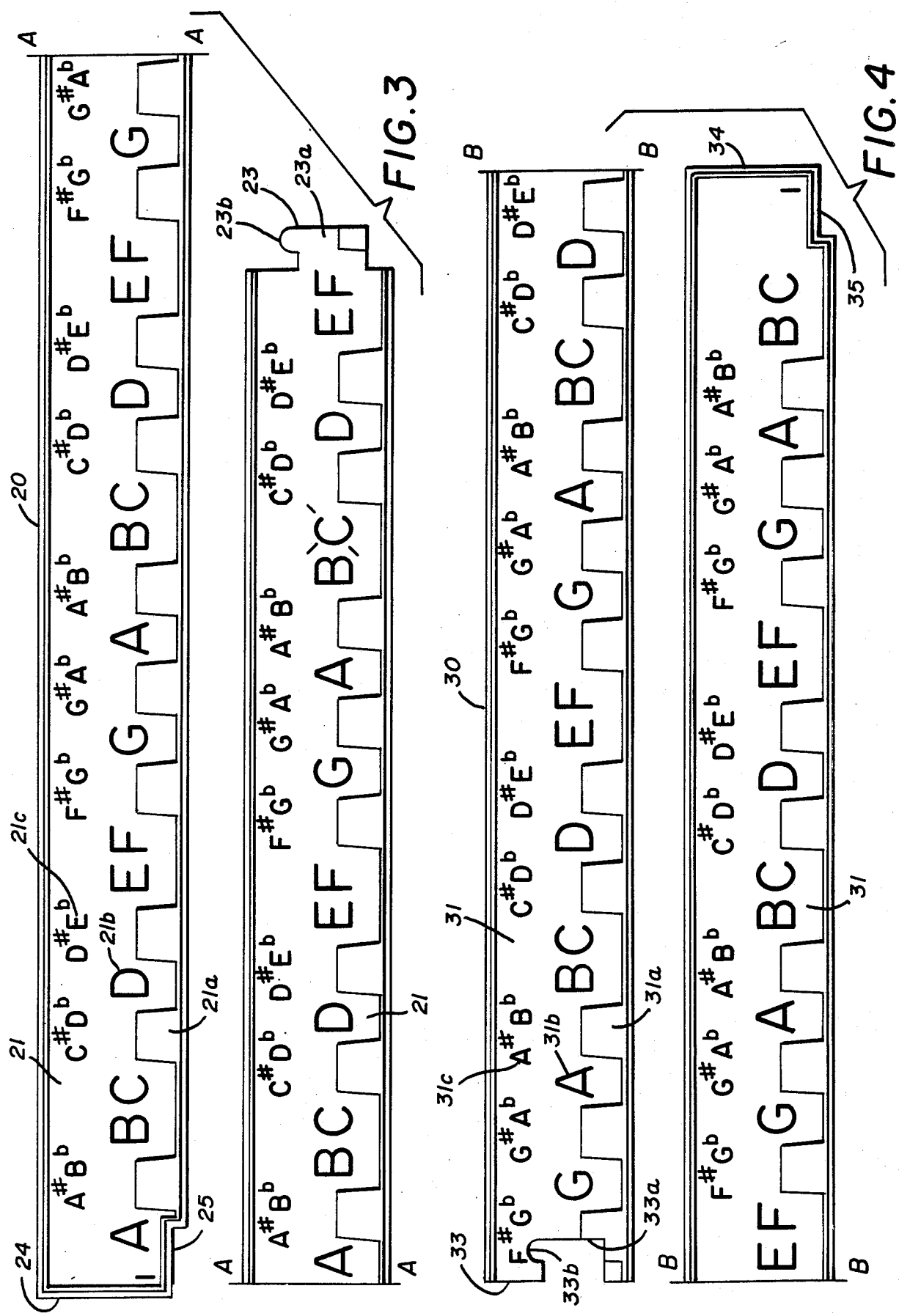

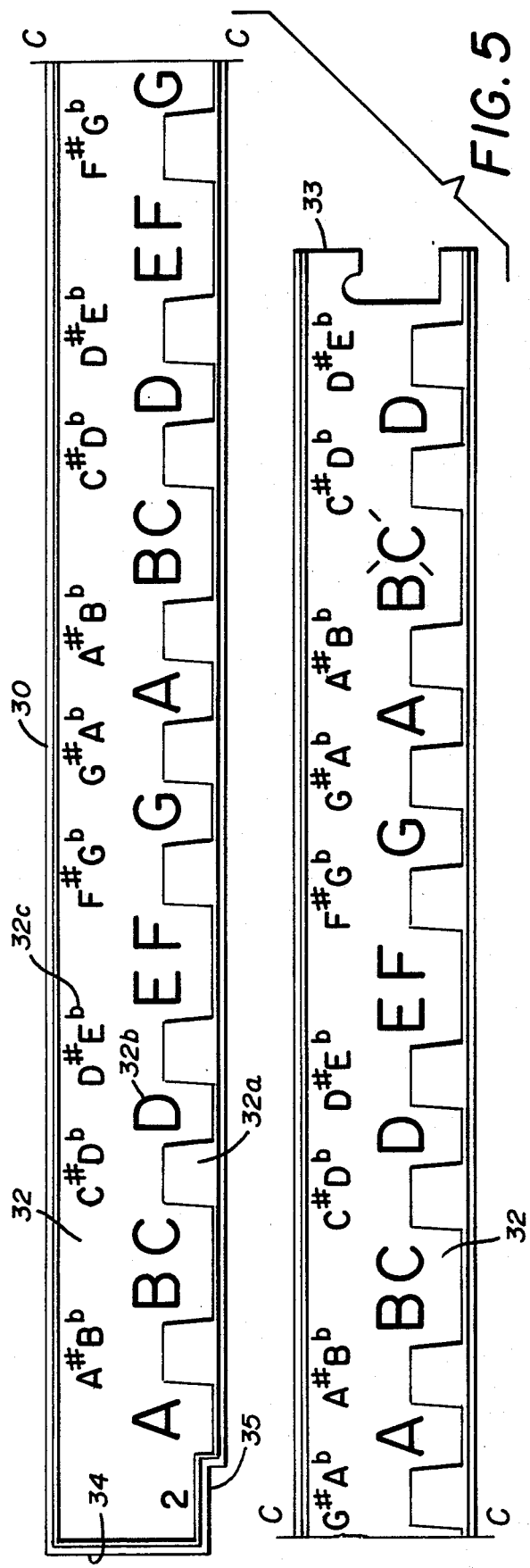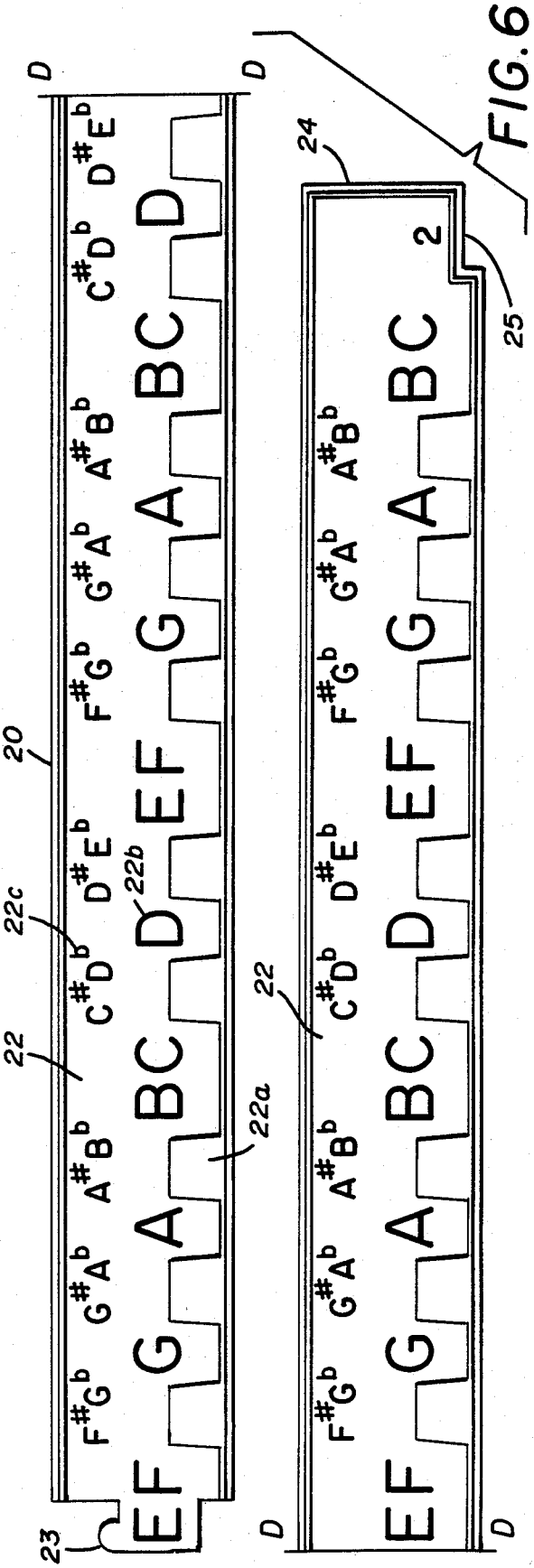

MUSICAL INSTRUMENT TEACHING AID

BACKGROUND OF THE INVENTION

This invention relates in general to teaching and playing aids for keyboard type instruments and relates in particular to a portable, universal teaching aid for use with such instruments.

DESCRIPTION OF THE PRIOR ART

In learning to play instruments such as the piano, it is necessary that the practitioner become conversant with the various keys to correlate the location of each note of the music with the appropriate keys. To this end, it is believed desirable to provide a device which can be mounted temporarily on the keyboard, immediately behind the keys, so as to facilitate the utilization of the same by the student. In effect then, the teaching aid constitutes a representation of the black keys in elevation, together with the appropriate note lettering and the appropriate sharp and flat designations.

A number of attempts have been made to provide devices of this type, as can be seen from a brief review of the patent prior art.

For example, Reeve U.S. Pat. No. 1,293,923 discloses a printed blank which in practice can be separated by cutting it into strips which are then secured together in an end-to-end relationship with a hinged or pivotal type connection. The device spans the entire length of the keyboard and is placed behind the black keys.

DeBellis U.S. Pat. No. 1,172,442 shows a hinged chart providing a reproduction of the keyboard and capable of being folded for storage and again being capable of being unfolded so as to span the length of the keyboard.

Leonard U.S. Pat. No. 4,254,686 is also of some interest, although utilizing a set of pocket-defining cards which divide the keyboard into octaves and a set of insert cards which carry indicia identifying chords, scales or other arrangements of notes.

Bostelmann U.S. Pat. No. 2,188,098 discloses a teaching or playing aid which has the notation for a specific composition disposed thereon and which can be mounted behind the keys for ready observation by the player.

Force U.S. Pat. No. 1,229,735 discloses a combined music chart and guard capable of being inserted behind the black keys, only for a selected distance therealong.

Von Bornstedt U.S. Pat. No. 1,293,997 discloses a similar teaching aid requiring the use of easel-like supports. Barnes U.S. Pat. Nos. 1,567,019 and 1,725,844 also show general teaching aids and instructional devices of the general type which correlate the notes of the musical scale with the keyboard of a piano or similar instrument. Weis U.S. Pat. No. 3,350,973 and Hertz U.S. Pat. No. 3,707,897 are also of general interest in showing various types of assistance devices for students or players.

While the prior art just described is presumably suitable for the purposes for which it was designed, it is believed that none of the art in question provides a simple two-piece device which is constructed so as to readily fit behind the black keys and wherein the indicia are so positioned as to accommodate various typical key spacings and various typical lengths of keyboards.

SUMMARY OF THE INVENTION

It is, therefore, an object of this invention to provide a teaching aid for use with keyboard instruments, such as a piano, which is readily transportable, quickly mountable and demountable with respect to the instrument, capable of receiving a first set of indicia on a first surface to accommodate a first typical key spacing and a second set of indicia on a second surface to accommodate a second typical key spacing, and constructed so as to be securely mounted with respective varying lengths of keyboards.

It has been found that this object can be achieved by providing two interfitting sections of lightweight, rigid material which can be readily snapped together for use and snapped apart for transportation and storage.

It has further been found that this object can be achieved by providing notched ends on each of the sections which can engage the end pieces of the piano so as to accommodate various keyboard lengths.

Accordingly, production of an improved musical instrument teaching aid of the character above-described becomes the principal object of this invention with further objects thereof becoming more apparent upon a reading of the following brief specification considered and interpreted in view of the accompanying drawings.

OF THE DRAWINGS:

FIG. 1 is a partially schematic, perspective view showing my improved teaching aid in place on the instrument.

FIG. 2 is a sectional view taken along the line 2—2 of FIG. 1.

FIG. 3 is an elevational view showing the first or front surface of the first section of the device.

FIG. 4 is an elevational view showing the first or front surface of the second section of the device.

FIG. 5 is an elevational view showing the rear or second surface of the second section of the device.

FIG. 6 is an elevational view showing the rear or second surface of the first section of the device.

BRIEF DESCRIPTION OF THE PREFERRED EMBODIMENTS

It should first be noted that the present invention is intended for use with keyboard type instruments. Therefore, while the invention will be illustrated and described in connection with utilization on a piano, it is not necessarily intended to be so limited, although reference will be made herein to a piano for simplicity and conciseness of explanation.

With that in mind, and referring first to FIG. 1 of the drawings, it will be seen that the typical piano 40 has a frame 41 and a series of black and white keys 42,43 disposed between end pieces 41a,41a and a back board 44. No detail will be either illustrated or described with regard to the structure of the piano per se, since the same is well-known in the art.

It should be noted, however, that Applicant has found that pianos are not uniform in length or in key spacing. Thus, Applicant has found that most pianos have keyboards with one of two standard lengths and most pianos have key spacing and, thus, octave spacing of one of two standard dimensions. For example, about ninety-five percent of commonly used pianos have been found to have a key spacing such that an octave will span either 6½ inches or 6 7/16 inches. Additionally, while most standard keyboards have been found to be about forty-nine inches, some, such as on spinets, may be forty-seven and three-quarters inches. As noted previously, Applicant's object is to provide a substantially universal teaching aid which will accommodate such standard variations.

With that in mind, and referring again to FIG. 1 of the drawings, it will be noted that the teaching aid, generally indicated by the numeral 10, comprises a first section 20 and a second section 30 which are dimensioned so that, when snapped together, as illustrated in FIG. 1 of the drawings, they will essentially span the length of the keyboard and be capable of being located behind the inner ends of the black keys, adjacent back board 44, all as clearly illustrated in FIG. 1 of the drawings.

Reference to FIGS. 3 and 4 of the drawings will be then had for a detailed description of the front or first face of the teaching aid 10.

FIG. 3 thus shows a first section 20 which has a front or first face 21. In practice, and as illustrated in the drawings, indicia, such as the numeral 1 which can be seen in the lower, left-hand corner of FIG. 3, will be used to designate that this is the front or first face.

On that face 21 are a series of raised members typically colored black and designated by the numeral 21a which will correspond with the black keys. A set of indicia, generally indicated by the numeral 21b, is disposed along the front face and represent musical notes. A second set of indicia, generally indicated by the numeral 21c, will designate the sharps and flats of the notes. In this fashion, it will be readily apparent that once the first section 20, for example, is located in position, as shown in FIG. 1, the key and note designations will correspond to and be aligned with the actual keys on the keyboard, providing a ready point of reference for the user.

With reference to FIG. 4, it will be seen that the second section of the teaching aid, generally designated by the numeral 30, also has a front or first face 31, a set of black key indicia 31a, a set of key and note indicia 31b and a set of sharp and flat note indicia 31c.

Referring to FIGS. 3 and 4 now, it will be seen that sections 20 and 30 each have a first end 24,34 and this end is notched at the bottom of the section, as indicated at 25 and 35. This notching enables these ends to fit over the end board 41a of the piano, as illustrated with respect to the second section 30 in FIG. 1 of the drawings.

Again referring to FIGS. 3 and 4 of the drawings, it will be seen that the section or opposed ends of the first and second section have interfitting configurations. Thus, the second end of the first section 20 has a projection 23 which comprises a main body 23a and a vertically extending rounded shoulder 23b. By like token, the second end 33 of the second section 30 has a recess 33a which has a vertically extending arcuate cutout area 33b whose configuration corresponds to that of projection 23a and shoulder 23b so that the end 23 may be snapped in place in the end 33 so as to butt those ends up against each other and produce an overall teaching aid 10 which spans the length of the keyboard.

FIGS. 5 and 6 are similar view to FIGS. 3 and 4 representing the second or reverse side of the first and second sections 20 and 30. Again, the second side is identified in some way, such as, in the case of the drawings, utilization of the numeral 2, as can be seen, for example, in the lower, left-hand corner of FIG. 5 or the lower, right-hand corner of FIG. 6.

Again, the first section 20 has a second or rear face 22 bearing the indicia 22a, 22b and 22c which correspond to the indicia on the front or first surface 21. Likewise, the second section 30 has a rear or second fact 32 which bears the indicia 32a, 32b and 32c.

The ends of the first and second sections 34 and 33 in the one case and 24 and 23 in the other are configured as previously described and, of course, being the same piece only reversed, will snap together.

It will be noted that the spacing of the indicia on the first or front surfaces 21 and 31 differs from that of the spacing on the rear or second surfaces 22 and 32.

As previously noted, Applicant has found that most standard pianos will have one or the other of two standard key spacings. By providing the front and rear surfaces 21,22 and 31,32 with different note spacing, both of the most common standard key spacings can be accommodated. As also previously noted, Applicant has found that the overall length of the keyboard of most standard pianos is one of two dimensions. By provision of the notches 25 and 35, the teaching aid can readily fit over the end boards of the piano, regardless of which of the two most common standard lengths are involved. It will also be noted that, if necessary, the ends 24 and 34 may be cut off to assist in fitting the device to shorter keyboards if required.

While a full and complete description of the invention has been set forth in accordance with the dictates of the Patent Statutes, it should be understood that modifications can be resorted to without departing from the spirit hereof or the scope of the appended claims.

Thus, as previously noted, while the device has been illustrated and described with reference to pianos, it is believed to have equal utility with other keyboard type instruments.

Also, while the sections 20 and 30 have been described as being constructed of rigid, lightweight material, the invention is not intended to be limited by the material of which the sections are constructed.

What is claimed is:

1. A teaching aid for keyboard instruments having one or more standard lengths, comprising:
    (a) a rigid member adapted to be positioned behind the keys;
    (b) said member having front and rear indicia bearing surfaces;
    (c) said member being collapsible and including a first section and a second section releasably interconnectable with each other;
    (d) said first and second sections being elongate, substantially flat segments each having first and second ends with said first ends being releasably engagable with each other and said second ends being engagable with the frame of said instrument; and
    (e) said second ends including elongate notches extending inwardly therefrom with said notches extending inwardly a sufficient distance to engage the end boards of instruments of varying standard lengths.

2. The teaching aid of claim 1 wherein said first ends of said first and second sections have male and female locking means disposed thereon.

3. The teaching aid of claim 1 wherein said indicia bearing surfaces bear raised, identical indicia indicating musical note notations corresponding to the keys of the keyboard; and said indicia on said front surface bearing note notations having a first spacing arrangement and said indicia on said rear surface bearing note notations having a second spacing arrangement, different from said first spacing arrangement.

* * * * *

UNITED STATES PATENT AND TRADEMARK OFFICE
CERTIFICATE OF CORRECTION

PATENT NO. : 4,905,567
DATED : March 6, 1990
INVENTOR(S) : Nicholas J. Kavoklis and Mary Ellen B. Kavoklis It is certified that error appears in the above-identified patent and that said Letters Patent is hereby corrected as shown below:

In Column 3, Line 50, delete "section" and substitute therefor --second--.

Signed and Sealed this

Fourteenth Day of May, 1991

Attest:

HARRY F. MANBECK, JR.

*Attesting Officer*  *Commissioner of Patents and Trademarks*